Nov. 2, 1937.  A. G. BUTLER  2,097,996
AUXILIARY SURFACE CONTROL
Filed Nov. 1, 1935
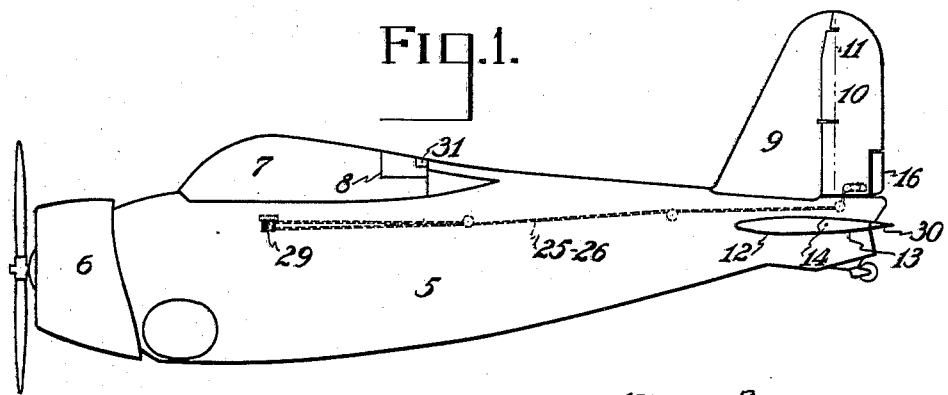
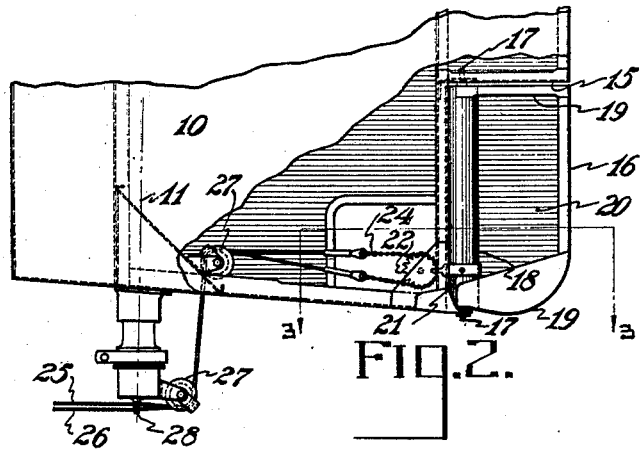
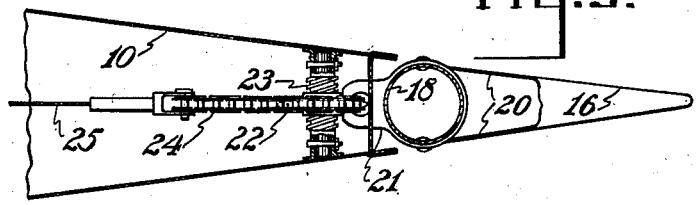
INVENTOR.
ARTHUR G. BUTLER
BY
ATTORNEYS.

Patented Nov. 2, 1937

2,097,996

UNITED STATES PATENT OFFICE 2,097,996

AUXILIARY SURFACE CONTROL

Arthur G. Butler, Eggertsville, N. Y., assignor, by mesne assignments, to Curtiss-Wright Corporation, a corporation of New York Application November 1, 1935, Serial No. 47,775

3 Claims. (Cl. 244—75)

This invention relates to aircraft and more specifically to improvements in operating mechanisms for the air controls thereof.

The principles of the invention may be applied to various types of movable control surfaces, but for illustration, I choose to apply the operating mechanism to control or trimming flaps such as are applied to the main movable control airfoils for the purpose of trimming the aircraft in flight, or for the purpose of servo control.

Objects of the invention are to provide a control mechanism for a movable airfoil; to provide a control mechanism for auxiliary trimming flaps; to provide an airfoil control mechanism which lies wholly within the bounding surfaces of the associated parts; to provide a control mechanism of great simplicity and sturdiness and one which is capable of fine adjustment; and to provide an irreversible airfoil control mechanism by which flutter and consequent high stresses in the structure are minimized.

Other objects will become apparent in reading the following detailed description and claims and in viewing the drawing, in which:

Fig. 1 is a side elevation of an aircraft embodying this invention;

Fig. 2 is an enlarged elevation partly in section, showing the details of the invention as applied to the aircraft rudder; and Fig. 3 is a section on the line 3—3 of Fig. 2.

The generally conventional airplane comprises a fuselage 5, power plant 6, high wings 7 having ailerons 8, and an empennage including a fin 9, rudder 10 hinged thereto on the axis 11, horizontal stabilizer 12, and elevators 13 hinged thereto at 14.

At the trailing edge of the rudder 10, a cutout 15 is formed within which a relatively small flap 16 is hinged to the rudder 10 on pivots 17, the axis of these pivots being substantially parallel to the rudder axis 11. The flap 16 comprises a tube forming the main structural member thereof, to which end ribs 19 and covers 20 are attached, the latter tapering to a sharp trailing edge. The tube 18 carries a forwardly extending bifurcated claw 21 which enters into the rudder interior, the claw embracing a wheel 22 axially movable along a shaft 23 fixed in the rudder 10 on an axis normal to the flap hinge axis. The wheel 22 is screw-mounted on the shaft 23 so that, by turning the wheel it is shifted along the screw, the wheel side faces bearing on the claw 21 to turn the flap about its hinge axis.

The wheel may be formed as a sprocket over which a chain 24 runs, the chain ends being shackled to cables 25 and 26 which run over sheaves 27 fixed to the rudder structure, whence they pass forwardly through the rudder hinge axis 11, through fair-leads 28 thereat, to terminate in a pilot-turnable drum 29 in the control cockpit.

Rotation of the drum 29 rotates the wheel 22 to shift the flap angularly with respect to the rudder. By the screw connection of the wheel on the shaft 23, the flap is irreversible and is always held in fixed angular relation to the rudder unless adjustment of the drum 29 is effected.

The operating mechanism has been described with particular reference to a flap 16 on the rudder 10, but flaps 30 on the elevators 13, and flaps 31 on the ailerons 8, may be controlled by the same character of mechanism.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What is claimed is:

1. In an aircraft control surface having a flap pivotally attached to its rear portion, operating means for said flap comprising a fixed screw shaft transversely mounted within said control surface, a disc member threadedly engaging the said shaft, means associated with the periphery of the disc member adapted to impart rotation and transverse translation thereto along said shaft, and a bifurcated member attached to said flap member having its bifurcations transversely spaced and embracing the said disc member, whereby rotation of the latter results in pivotal movement of the said flap.

2. In an aircraft control surface having a flap pivotally attached to its rear portion, operating means for said flap comprising a fixed screw shaft transversely mounted within said control surface, a disc member threadedly engaging the said shaft, means associated with the periphery of the disc member adapted to impart rotation and transverse translation of the disc member along said shaft, a bifurcated member attached to said flap member having its bifurcations transversely spaced and embracing the said disc member, the said rotation imparting means passing through the opening between the said bifurcations and serving to maintain the said means in operative relation with said disc.

3. In irreversible operating mechanism for aircraft, a movable control surface, a fixed screw shaft extending transversely to the line of flight of the aircraft, a control tab positioned within a cutout portion of said surface and hinged thereto, an internally threaded sprocket member rotatable and translatable about the screw shaft, the said sprocket having a radially disposed web plate with teeth at its periphery, a bifurcated claw member attached to the tab and embracing the sides of the said sprocket web, an enlarged opening in the claw member adjacent the said toothed periphery, and means engaging the said teeth and guided within the said opening to position said control tab.

ARTHUR G. BUTLER.